US012694702B2

(12) United States Patent
Kwapong et al.

(10) Patent No.: US 12,694,702 B2
(45) Date of Patent: Jul. 28, 2026

(54) TRAINING OF AN ELECTRONIC DOCUMENT EXTRACTION MODEL

(71) Applicant: Intuit Inc., Mountain View, CA (US)

(72) Inventors: Benjamin Adetor Kwapong, San Jose, CA (US); Hui Chen, San Jose, CA (US); Tharathorn Joy Rimchala, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 360 days.

(21) Appl. No.: 18/410,785

(22) Filed: Jan. 11, 2024

(65) Prior Publication Data

US 2025/0232604 A1    Jul. 17, 2025

(51) Int. Cl.
*G06V 30/19*        (2022.01)
*G06V 30/412*      (2022.01)
*G06V 30/414*      (2022.01)

(52) U.S. Cl.
CPC ...... *G06V 30/19147* (2022.01); *G06V 30/412* (2022.01); *G06V 30/414* (2022.01)

(58) Field of Classification Search
CPC .......... G06N 20/00; G06N 3/09; G06N 5/025; G06V 30/40; G06V 10/761; G06V 10/764; G06V 10/82; G06V 30/414; G06V 30/19093; G06V 30/413; G06V 30/41; G06V 30/19147; G06V 30/412
See application file for complete search history.

(56) References Cited

U.S. PATENT DOCUMENTS

| | | | | |
|---|---|---|---|---|
| 8,996,350 B1* | 3/2015 | Dub | ...................... | G06F 16/353 |
| | | | | 707/673 |
| 10,891,699 B2* | 1/2021 | Admon | ................. | G06F 16/353 |
| 2021/0248446 A1* | 8/2021 | Hughes | .................. | G06N 3/045 |
| 2024/0256741 A1* | 8/2024 | Emanuel | ................. | G06F 21/10 |

OTHER PUBLICATIONS

Wang et al., "Sentence-Level Resampling for Named Entity Recognition," In Proceedings of the 2022 Conference of the North American Chapter of the Association for Computational Linguistics: Human Language Technologies, pp. 2151-2165. (Year: 2022).

* cited by examiner

*Primary Examiner* — Courtney Joan Nelson
(74) *Attorney, Agent, or Firm* — Paradice & Li LLP

(57) ABSTRACT

Systems and methods are disclosed for training an electronic document extraction model, including the generation of the training data to train the model based on sampling a pool of electronic documents based on a rareness metric of the documents. Each electronic document has a document-level rareness metric generated, with the document-level rareness metric being based on one or more of a structural rareness metric or a content rareness metric of the document. The structural rareness metric measures the rareness of the document structure, which may be irrespective of the text content of the document. The content rareness metric measures the rareness of the document content, which may be irrespective of the document structure. The electronic documents are sampled based on the document-level rareness metrics to increase the number of rare documents in the training data without unduly biasing the sampling to optimize the training data for training the extraction model.

18 Claims, 6 Drawing Sheets

300

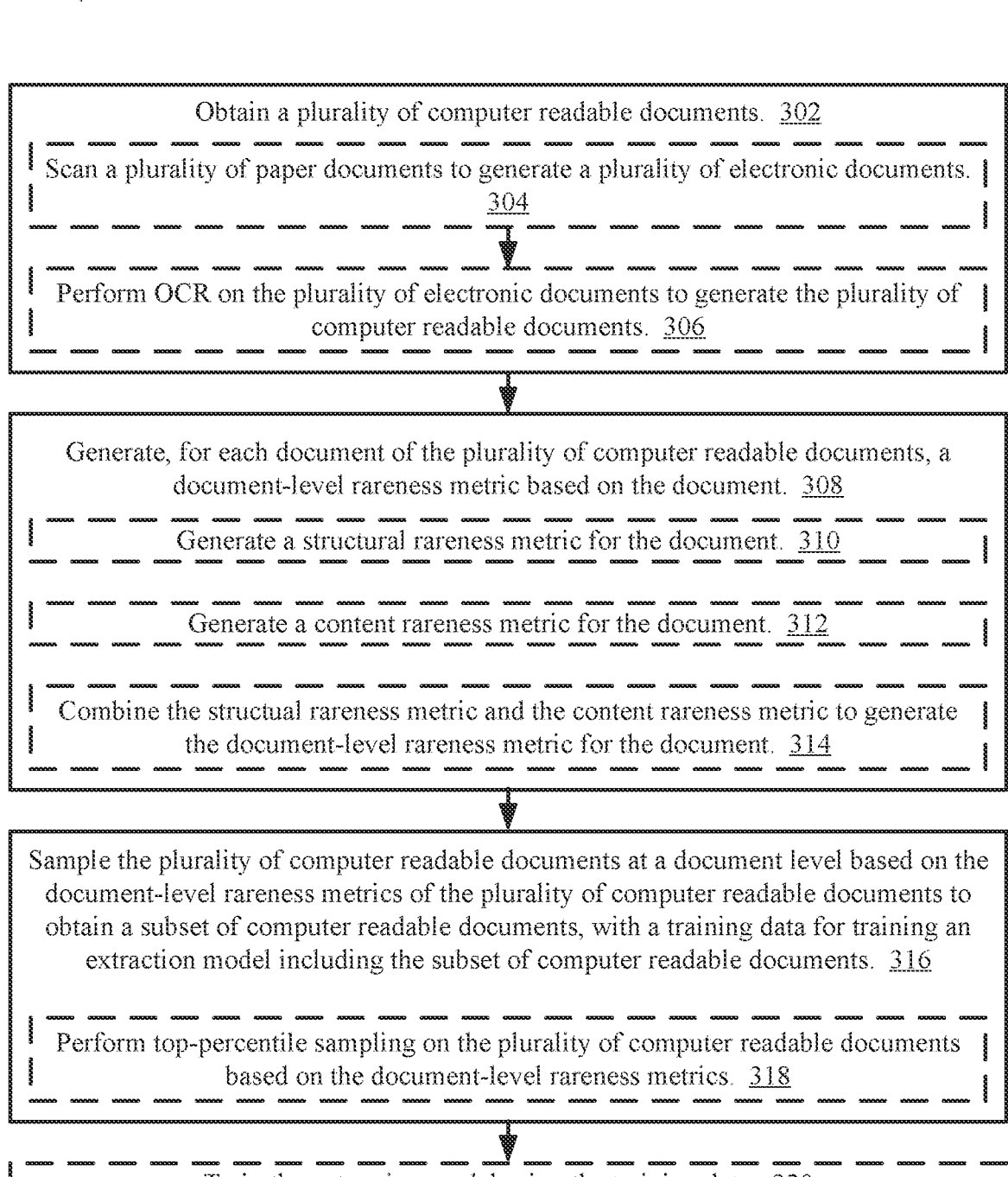

Obtain a plurality of computer readable documents. 302

Scan a plurality of paper documents to generate a plurality of electronic documents. 304

Perform OCR on the plurality of electronic documents to generate the plurality of computer readable documents. 306

Generate, for each document of the plurality of computer readable documents, a document-level rareness metric based on the document. 308

Generate a structural rareness metric for the document. 310

Generate a content rareness metric for the document. 312

Combine the structual rareness metric and the content rareness metric to generate the document-level rareness metric for the document. 314

Sample the plurality of computer readable documents at a document level based on the document-level rareness metrics of the plurality of computer readable documents to obtain a subset of computer readable documents, with a training data for training an extraction model including the subset of computer readable documents. 316

Perform top-percentile sampling on the plurality of computer readable documents based on the document-level rareness metrics. 318

Train the extraction model using the training data. 320

Generate, for each computer readable document of a plurality of computer readable documents, a plurality of bounding boxes in the computer readable document based on recognized text in the computer readable document. 402

Each bounding box in the computer readable document bounds only one word of the recognized text in the computer readable document. 404

Generate, for each computer readable document of the plurality of computer readable documents, an embedding of the computer readable document based on the plurality of bounding boxes of the computer readable document. 406

An LiLT model generates an embedding from the entire set of bounding boxes of the computer readable document. 408

Calculate, for a group including all computer readable documents of a same type from the plurality of computer readable documents, a centroid of the group, with the group including the first document. 410

The centroid of the group is a mean vector of the embeddings of the computer readable documents in the group. 412

Calculate a distance between the centroid and an embedding of the first document. 408

Calculate a covariance matrix of the group from the embeddings of the computer readable documents in the group, with the distance being calculated based on the covariance matrix. 410

Figure 4

500

Identify, for each computer readable document in a group of computer readable documents of a same type, a set of fields to be extracted. 502

Identify which fields across all sets of fields for the group are included in the first document. 504

Calculate a rareness of the identified fields in the first document, with the content rareness metric of the first document being based on the rareness of the identified fields in the first document. 506

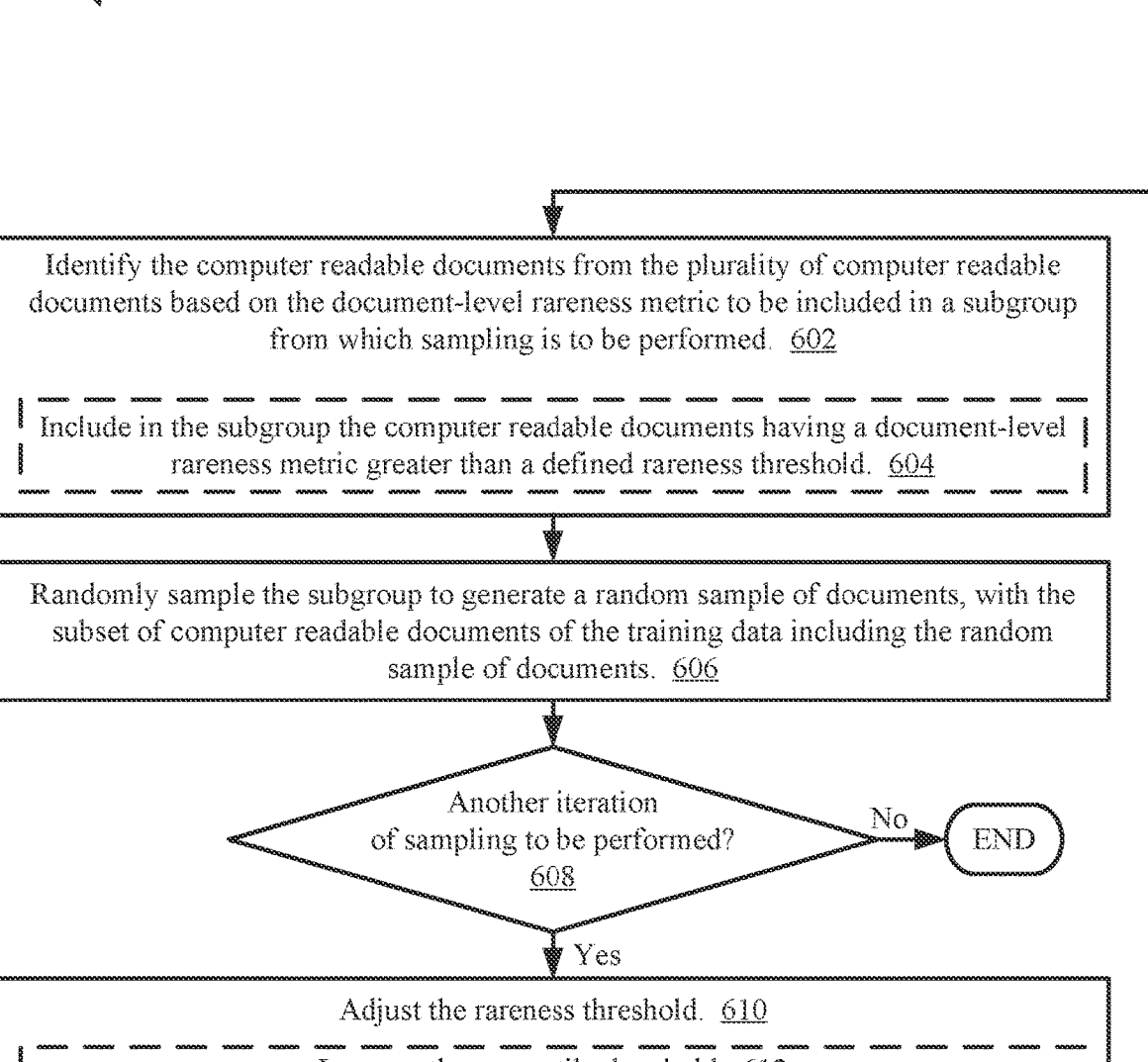

Identify the computer readable documents from the plurality of computer readable documents based on the document-level rareness metric to be included in a subgroup from which sampling is to be performed. 602

Include in the subgroup the computer readable documents having a document-level rareness metric greater than a defined rareness threshold. 604

Randomly sample the subgroup to generate a random sample of documents, with the subset of computer readable documents of the training data including the random sample of documents. 606

Another iteration of sampling to be performed? 608

No → END

Yes

Adjust the rareness threshold. 610

Increase the percentile threshold. 612

Figure 6

TRAINING OF AN ELECTRONIC DOCUMENT EXTRACTION MODEL

TECHNICAL FIELD

This disclosure relates generally to the training of an electronic document extraction model, including the generation of training data to train the model.

DESCRIPTION OF RELATED ART

An electronic document extraction model extracts relevant or desired information from electronic documents. For example, a document extraction model may extract a person's date and place of birth, parent names, or other information from a scanned birth certificate. In another example, a document extraction model may extract a person's vital information from a scanned driver's license or passport. In a further example, a document extraction model may extract information from a scanned application that was completed by hand, such as a job application, a loan application, or other types of applications that may be filled in using pen and paper and then scanned. While some extraction models are rule based to extract data from electronic documents, some extraction models may be configured as machine learning models, with the model to be trained or tuned to identify the data to be extracted.

SUMMARY

Systems and methods are disclosed for generating the training data for training an extraction model. In particular, the training data to be used to train an electronic document extraction model includes a set of electronic documents that are used as inputs to the electronic document extraction model. Alternative to naive random sampling of a large pool of electronic documents to generate the training data (which may inadvertently cause documents with rare information or formatting to be excluded from the training data and thus from use in training the model) or a manual selection of the electronic documents to generate the training data (which would be difficult to impossible as the number of documents to review may be in the millions or more), the system is configured to generate the training data in an automated manner by taking into account the rareness of various documents so that rarer documents are still represented in the training set-resulting in a diverse and more presentative training set. For example, a system generates a rareness metric for each electronic document, and sampling of the pool of electronic documents may be influenced by the rareness metric to ensure that at least a portion of rare documents are included in the training data while still sampling other documents considered more common to be included in the training data.

One innovative aspect of the subject matter described in this disclosure can be implemented as a computer-implemented method for generating training data for training an extraction model. The method includes obtaining a plurality of computer readable documents, with each of the computer readable documents being generated by performing optical character recognition (OCR) on an electronic document. The method also includes, for each document of the plurality of computer readable documents, generating a document-level rareness metric based on the document. The method further includes sampling the plurality of computer readable documents at a document level based on the document-level rareness metrics of the plurality of computer readable documents to obtain a subset of computer readable documents. The training data to train an extraction model includes the subset of computer readable documents. In some implementations, a document-level rareness metric of a document may include one or more of a structural rareness metric that indicates the rareness of the structure in the document or a content rareness metric that indicates the rareness of the content in the document. In some implementations, sampling the plurality of computer readable documents may include performing top-percentile sampling on the plurality of computer readable documents based on the document-level rareness metrics of the plurality of computer readable documents.

Another innovative aspect of the subject matter described in this disclosure can be implemented in a system for generating training data for training an extraction model. An example system includes one or more processors and a memory storing instructions that, when executed by the one or more processors, cause the system to perform operations. The operations include obtaining a plurality of computer readable documents, with each of the computer readable documents being generated by performing OCR on an electronic document. The operations also include, for each document of the plurality of computer readable documents, generating a document-level rareness metric based on the document. The operations further include sampling the plurality of computer readable documents at a document level based on the document-level rareness metrics of the plurality of computer readable documents to obtain a subset of computer readable documents. The training data to train an extraction model includes the subset of computer readable documents. In some implementations, a document-level rareness metric of a document may include one or more of a structural rareness metric that indicates the rareness of the structure in the document or a content rareness metric that indicates the rareness of the content in the document. In some implementations, sampling the plurality of computer readable documents may include performing top-percentile sampling on the plurality of computer readable documents based on the document-level rareness metrics of the plurality of computer readable documents.

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3 shows an illustrative flow chart of an example operation of generating the training data to train an extraction model, according to some implementations.

FIG. 4 shows an illustrative flow chart of an example operation of generating a structural rareness metric for a computer readable document, according to some implementations.

FIG. 5 shows an illustrative flow chart of an example operation of generating a content rareness metric for a computer readable document, according to some implementations.

FIG. 6 shows an illustrative flow chart of an example operation of performing top-percentile sampling on a plurality of computer readable documents, according to some implementations.

Like numbers reference like elements throughout the drawings and specification.

DETAILED DESCRIPTION

Figure 1:
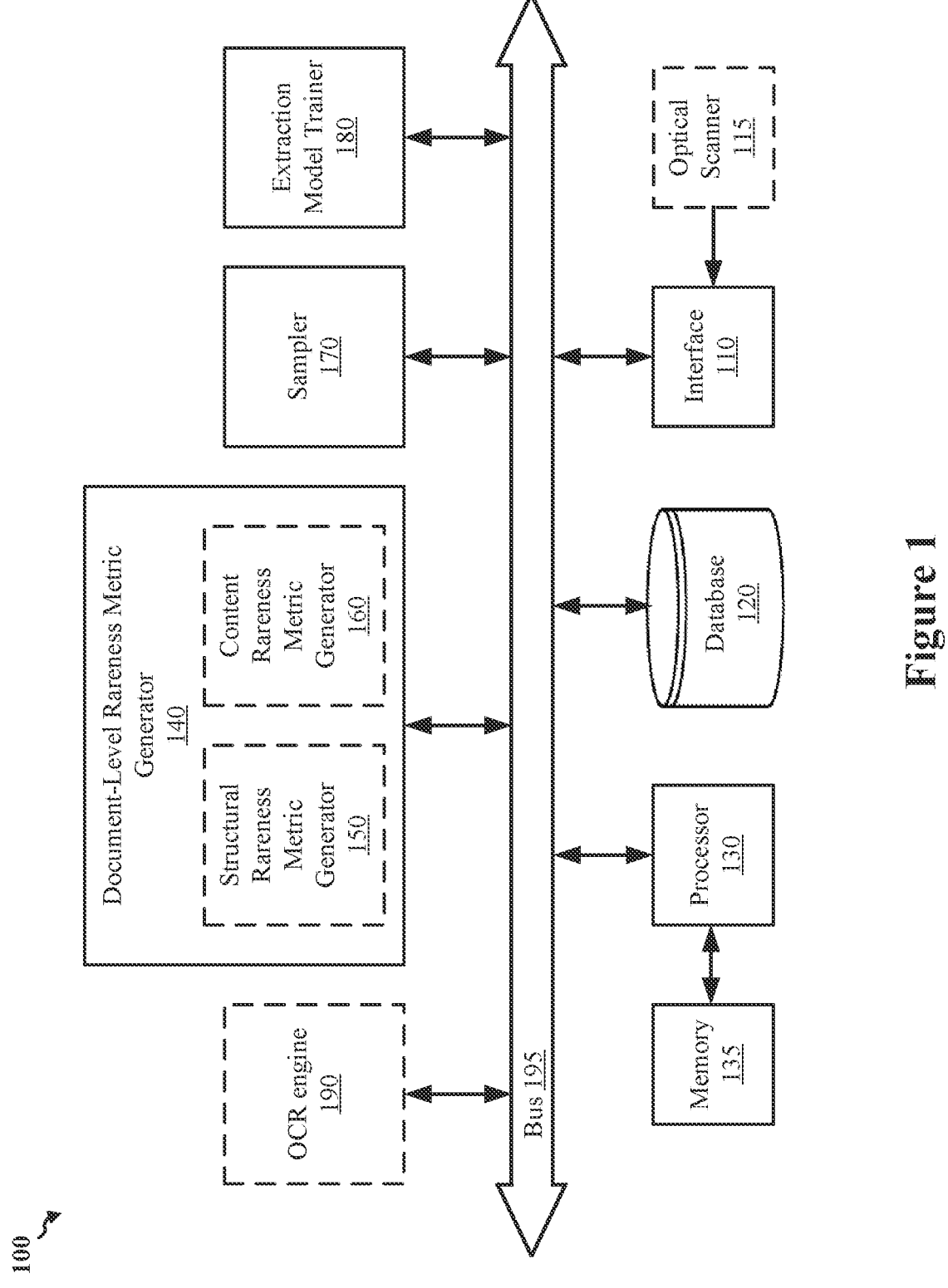
FIG. 1 shows an example system for training an extraction model, according to some implementations.

Implementations of the subject matter described in this disclosure may be used for training an extraction model, including the generation of training data for training such models. An extraction model (which may also be referred to herein as an electronic document extraction model or a document extraction model) extracts desired information from electronic documents. If the extraction model is rule-based, the model may be programmed to know the specific location of the information to be extracted from an electronic document. For example, a rule programmed into the model may indicate a window of pixels of the electronic document in which text of interest may exist, and the model may extract text from the defined location in the document.

To attempt to improve the performance of an extraction model, extraction models may be machine learning (ML) models trained to extract desired information from electronic documents. An ML model needs to be trained in order to be able to identify the text to be extracted from an electronic document (such as identifying the locations or type of text to be extracted). To train an ML-based extraction model, a set of training data is used, with the training data including inputs to the model for the model to attempt to identify and extract desired information from the inputs. For example, a set of electronic documents may be provided as inputs to the extraction model, with the extraction model outputting its attempt to extract the desired information. The extraction model may then be iteratively adjusted and again provided the documents based on the results of the extraction until the error rate of the extracted information is within a tolerance of the desired information to be extracted. With the extraction model trained, the extraction model may be used on new electronic documents to extract the desired information for which the model is trained to extract.

To generate the training data as a set of electronic documents, typically, a pool of historical electronic documents for which the desired information to be extracted from each document is known is randomly sampled to select a defined number of documents. In this manner, the training data does not include any prejudice towards any particular documents that may negatively impact the training of the extraction model.

However, a document may appear in a variety of different formats. For example, a driver's license from California and a driver's license from Nevada may include the same information (such as a driver's name, height, weight, eye color, restrictions, date of birth, and license number), but the formatting of the licenses differ such that the information appears at different locations in the license relative to each other. In addition, certain types of the document may be much rarer than other types of the document. For example, the number of American Samoa driver's licenses compared to the number of California driver's licenses is less than half of one percent.

For an extraction model to effectively identify desired text for extraction from a rarer electronic document, the training data to train the extraction model needs at least one example of the rare document for training. If random sampling of the entire pool of previous electronic documents is used to generate the training data, rarer documents may not be represented in the training data. As such, there exists a sparsity problem in generating the training data of documents such that the training data needs to stay as unbiased as possible while still accounting for subsets of documents that may be considered rare.

To attempt to alleviate sparsity problems, training data for other ML based problems typically may be generated manually, with one or more trained professionals with knowledge regarding machine learning to carefully review and select samples from a pool of candidates. However, with the number of electronic documents as well as the specific different types of the document for many extraction use cases being too large to be manually reviewed (such as in the millions or even billions of documents with an unknown number of different formats), manual generation of the training data may be impossible. As such, there is a need to effectively generate a training data in an automatic manner that takes into account the biasing of the sampling while also taking into account the sparsity of some document types in generating the training data.

As described herein, a system is configured to generate a document-level rareness metric to indicate the rareness or uniqueness of each document that may be included in the training data. The rareness metric may be based on content rareness (such as how rare are some of the types of text included in the document) and/or structural rareness (such as how rare is the formatting of at least a portion of the document). With the rareness metric generated for each document, the system is configured to sample the pool of documents in a manner to balance between incorporating different types of documents to address representation while preventing the sampling from being too biased towards a specific type of document (and thus preventing the entire training data set from being exclusively or too significantly weighted towards rarer documents based on the rareness metric). With the improved training data set, the extraction model may be trained to more effectively extract information from rarer document types while still being able to extract information from more common document types.

Various implementations of the subject matter disclosed herein provide one or more technical solutions to the training of ML based extraction models. As such, various aspects of the present disclosure provide a unique computing solution to a unique computing problem that did not exist prior to ML models. The training of specific machine learning technology (including extraction models) as described herein cannot be performed in the human mind, much less practically in the human mind, including the use of pen and paper. In addition, the millions or even billions of documents efficiently and objectively processed to generate the training data cannot be performed practically in the human mind, including the use of pen and paper.

FIG. 1 shows an example system 100 for training an extraction model, according to some implementations. The system 100 may also be used to execute the trained extraction model to extract desired information from electronic documents. The system 100 includes an interface 110, a database 120, a processor 130, a memory 135 coupled to the processor 130, a document-level rareness metric generator 140, a sampler 170, and an extraction model trainer 180. The system 100 may also include an optical scanner 115 coupled to the interface 110 and an optical character recognition (OCR) engine 190. In some implementations, the various components of the system 100 may be interconnected by at least a data bus 195, as depicted in the example of FIG. 1. In other implementations, the various components of the system 100 may be interconnected using other suitable signal routing resources.

The interface 110 may be one or more input/output (I/O) interfaces to obtain electronic documents and provide one or more of training data to train an extraction model, a trained extraction model, or extracted data from the electronic documents. The interface 110 may also receive the extraction model to be trained, and the interface 110 may also receive or provide inputs or outputs for continued operation of the system 100. An example interface may include a wired interface or wireless interface to the internet or other means to communicably couple with other devices. In some implementations, the interface 110 may include an interface with an ethernet cable or a wireless interface to a modem, which is used to communicate with an internet service provider (ISP) directing traffic to and from other devices. For example, the system 100 may be remote to a user device (such as a user's personal computer (PC)) that provides the electronic documents from paper documents scanned by the user and stored on the user device, and the interface 110 may receive the electronic documents (which may be before or after performing OCR on the electronic documents). In some implementations, the system 100 includes an optical scanner 115 coupled to the interface 110 to scan paper documents and thus generate electronic documents from the scanned paper documents. Examples of an optical scanner 115 include a flatbed scanner, a camera, or another suitable optical capture device.

The database 120 may store the electronic documents, computer readable documents generated from the electronic documents, text extracted from the documents, bounding box information, or other information regarding the computer readable documents or the electronic documents. The database 120 may also store rareness metrics generated by the document-level rareness metric generator 140, the training data generated by the sampler 170, an extraction model to be trained, a trained extraction model, or other information for operation of the system 100. The database 120 may also store hyperparameters configured for any models used in the components 140-190 or other computer executable instructions or data for operation of the system 100. In some implementations, the database 120 may include a relational database capable of presenting information (such as the rareness metrics or the training data samples) as datasets in tabular form and capable of manipulating the datasets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications, the document-level rareness metric generator 140, the sampler 170, the extraction model trainer 180, and in some implementations, the OCR engine 190. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the document-level rareness metric generator 140, the sampler 170, the extraction model trainer 180, and in some implementations, the OCR engine 190 that may be executed by the processor 130. The memory 135 may also store inputs, outputs, or other information associated with the components 140-190 of the system 100 or any other data for operation of the system 100. In some implementations, hardwired circuitry may be used in place of, or in combination with, software instructions to implement aspects of the disclosure. As such, implementations of the subject matter disclosed herein are not limited to any specific combination of hardware circuitry and/or software.

In some implementations in which the system 100 includes an OCR engine 190, the OCR engine 190 performs OCR on the electronic documents obtained by the interface 110 and stored in the database 120. For example, a paper document is scanned by the optical scanner 115 to generate an electronic document, which is obtained by the interface 110, and the OCR engine 190 performs OCR on the electronic document to generate a computer readable document. A computer readable document is a document in which the text has been identified and encoded as computer readable text (such as in the American Standard Code for Information Interchange (ASCII) format). In some implementations, the OCR engine 190 generates bounding boxes around each token (such as each word) in the electronic document during the OCR process, with the bounding box information (such as the corner locations or other boundary information) being included in the computer readable document. The computer readable documents are to be inputs to the document-level rareness metric generator 140, with the generator 140 to generate a rareness metric for each computer readable document (and thus for each electronic document).

A document may be associated with two types of rareness: a structural rareness and a content rareness. A structural rareness of a document is the rareness of the structure or format of the document without relation to the content. A specific type of document may have various different formats, with some formats more common than others, but the content may be the same between formats. For example, in some implementations, the documents to be processed are tax-related documents, with a trained extraction model to be used to extract information from an entity's tax-related documents (such as any 1090s, W-2s, or other United States tax-related documents for income, benefits, expenses, dividends, etc.) in order to automatically fill in Internal Revenue Service (IRS) or state specific tax forms in the TurboTax® platform from Intuit® or to perform functions within the QuickBooks Online® (QBO) platform from Intuit. As such, one specific document from which data is to be extracted is a W-2 income statement. Typically, a W-2 statement includes one window of information on one page, with the window including various boxes of specific information (such as employee's name, tax identification number, employer's address, gross income, etc.). Sometimes, a document with W-2 information includes two instances of the window arranged vertically on the page. Additionally, though less frequently, a document with W-2 information may include four instances of the window arranged in a 2×2 pattern on the page. As such, while a W-2 document may exist in at least three different formats, the content may be the same between documents, just arranged differently.

Because a same type of document may exist in different formats, an extraction model is desired to identify the different locations in the document in which the desired text may appear as a result of the different formats in the same type of document. For example, since a W-2 statement may have at least three different formats, it is desired for the extraction model to be able to identify the locations of desired text in all of the different formats of the same document. To be able to identify the different potential locations of desired text, the extraction model is to be trained with at least some examples of the different formats of the same type of document. As such, it is desired that the training data may include samples of the different format documents. As used herein, a sample refers to a document included in the training data, which is sampled by the sampler 170 from the overall pool of documents from which the samples are to be taken. The overall pool of documents are the plurality of computer readable documents (and thus electronic documents) for which the document-level rareness metric generator 140 generates a rareness metric in preparation for training the extraction model by the extraction model trainer 180.

In addition or alternative to structural rareness, a document may be associated with a content rareness. A content rareness of a document is the rareness of at least some text content of the document without relation to the structure. For example, referring back to a W-2 income statement, an employer identification number, name, and address, employee wages, federal income tax withheld, an employee social security number, name, and address, social security tax withheld, and Medicare tax withheld are common W-2 boxes or fields including text that may be extracted. In addition to the above stated fields, other fields that are less likely to include text also exist within a W-2 income statement, such as a "nonqualified plans" field, a "dependent care benefits" field, and an "other" field. However, even though fewer W-2s include text in those fields, some W-2s do include text in those fields. As such, the text content in those fields is rarer than the other above mentioned text content.

Even though some content may be rarer than other content in a document, it is desired that the extraction model is able to extract the content if desired (such as for filling in IRS tax forms in TurboTax or other suitable applications). To be able to identify all desired text (no matter of its rareness in a document), the extraction model is to be trained with at least some example documents having the rarer content. As such, it is desired that the training data may include samples of documents having various rare content.

The document-level rareness metric generator 140 is to generate a document-level rareness metric for each computer readable document (such as the documents generated by the OCR engine 190) provided as an input to the document-level rareness metric generator 140. In some implementations, the document-level rareness metric generator 140 includes a structural rareness metric generator 150 to generate a structural rareness metric for a computer readable document, with the document-level rareness metric for the document being the structural rareness metric. In some other implementations, the document-level rareness metric generator 140 includes a content rareness metric generator 160 to generate a content rareness metric for a computer readable document, with the document-level rareness metric for the document being the content rareness metric. In some further implementations, the document-level rareness metric generator 140 includes both the structural rareness metric generator 150 to generate the structural rareness metric and the content rareness metric generator 160 to generate the content rareness metric for a computer readable document, with the document-level rareness metric for the document being a combination of the structural rareness metric and the content rareness metric. For example, while not shown in FIG. 1, the document-level rareness metric generator 140 may include logic to perform a summation (sum), perform a weighted sum, perform a simple average, or perform a weighted average of the structural rareness metric and the content rareness metric (with the two metrics normalized to each other) to generate the document-level rareness metric for the computer readable document. To note, the rareness metrics may be stored by the database 120 for use by the sampler 170 in sampling the documents and thus generating the training data of documents to be used to train the extraction model. Operations of the structural rareness metric generator 150 and the content rareness metric generator 160 to generate the document-level rareness metric are described in more detail below with reference to FIGS. 2-5.

The sampler 170 samples the computer readable documents/electronic documents based on the document-level rareness metrics of the computer readable documents. For example, the training data to be used to train an extraction model to extract text from a W-2 statement may be defined to be a specific size (such as 10,000 documents). The sampler 170 thus performs sampling to identify the 10,000 computer readable documents of W-2 statements from all of the computer readable documents of W-2 statements for which a document-level rareness metric is calculated. In some implementations, the sampler 170 performs top-percentile sampling to attempt to prevent bias in the sampling while still accounting for rarer documents (based on the document-level rareness metric) being included in the training data. Operations of the sampler 170 (including top-percentile sampling) are also described in more detail below with reference to FIGS. 2, 3, and 6.

The extraction model trainer 180 trains the extraction model using the training data generated by the sampler 170. In some implementations, the extraction model trainer 180 performs supervised learning based on a loss function between the extracted results and the desired results for the documents, with iterative adjustments to the extraction model being made and processing of the documents in the training data being repeated to reduce the loss of the loss function. To note, the electronic documents (and thus the computer readable documents) are prior documents for which the text to be extracted is known and defined for each document. For example, in the W-2 statement example, W-2s from prior tax years used to generate IRS tax documents have been previously reviewed, with the text from the W-2 desired to be extracted having been included in the IRS tax documents. As such, electronic documents including W-2 statements from prior years (with its content known and defined) are used for generating the training data by the system 100. The documents to be used may be sourced over a large plurality of users who have consented to their use to ensure that there is a sufficient pool of documents over which the training data may be generated (such as over millions or tens of millions of documents). With the content known, the content of a computer readable document is encoded as a label for the document, thus indicating the desired text to be extracted by the extraction model from the document. To note, the labels for the documents may also be stored in the database 120. With the labels, the loss function may be defined between the actual extracted text output by the extraction model during training and the desired extracted text based on the label to generate the loss to be minimized during training. To note, any suitable machine learning (ML) based extraction model may be trained and used.

After training of the extraction model is completed by the extraction model trainer 180, the system 100 may apply the trained extraction model to any new documents for which the model is trained to process. For example, if the extraction model is trained to extract different fields of text from a document including a W-2 statement, the optical scanner 115 may scan the paper document including the statement to generate an electronic document including the statement. The OCR engine 190 may then process the electronic document to generate a computer readable document. The system 100 may then provide the computer readable document to the trained extraction model, and the extraction model may extract the fields of text from the document input to the model.

In some implementations, the system 100 may also distribute the trained model to other devices via the interface 110 (such as to other devices executing a platform to utilize the extraction model, such as TurboTax or QBO in the above examples). If the system 100 is to distribute the model to other devices, the interface 110 may connect to a communications network having communication links between the system 110 and each of the devices communicably coupled with the system 100. The communications network can be any suitable one or more communication networks including the Internet, a wide area network (WAN), a metropolitan area network (MAN), a wireless local area network (WLAN), a personal area network (PAN) such as Bluetooth®, a portion of the Public Switched Telephone Network (PSTN), a cellular telephone network, a radio access network (RAN) such as a Fifth Generation (5G) New Radio (NR) system, an Ethernet network, a cable network, a satellite network, or any combination thereof.

While the document-level rareness metric generator 140 (including one or more of the structural rareness metric generator 150 or the content rareness metric generator 160), the sampler 170, the extraction model trainer 180, and the OCR engine 190 are depicted as separate components of the system 100 in FIG. 1, the components 140-190 may be included in software including instructions stored in memory 135 or the database 120, may include application specific hardware (e.g., one or more ASICs), or a combination of the above. As such, the particular architecture of the system 100 shown in FIG. 1 is but one example of a variety of different architectures within which aspects of the present disclosure may be implemented. In addition, in other implementations, components of the system 100 may be distributed across multiple devices, may be included in fewer components, and so on. While the examples herein are described with reference to system 100, any suitable system may be used to perform the operations described herein. If the components are software, the components may be implemented using any suitable computer readable language. For example, each of the components 140-190, as well as the extraction model to be trained, and the configuration and interoperability of such components may be programmed in the Python programming language using any suitable libraries.

Figure 2:
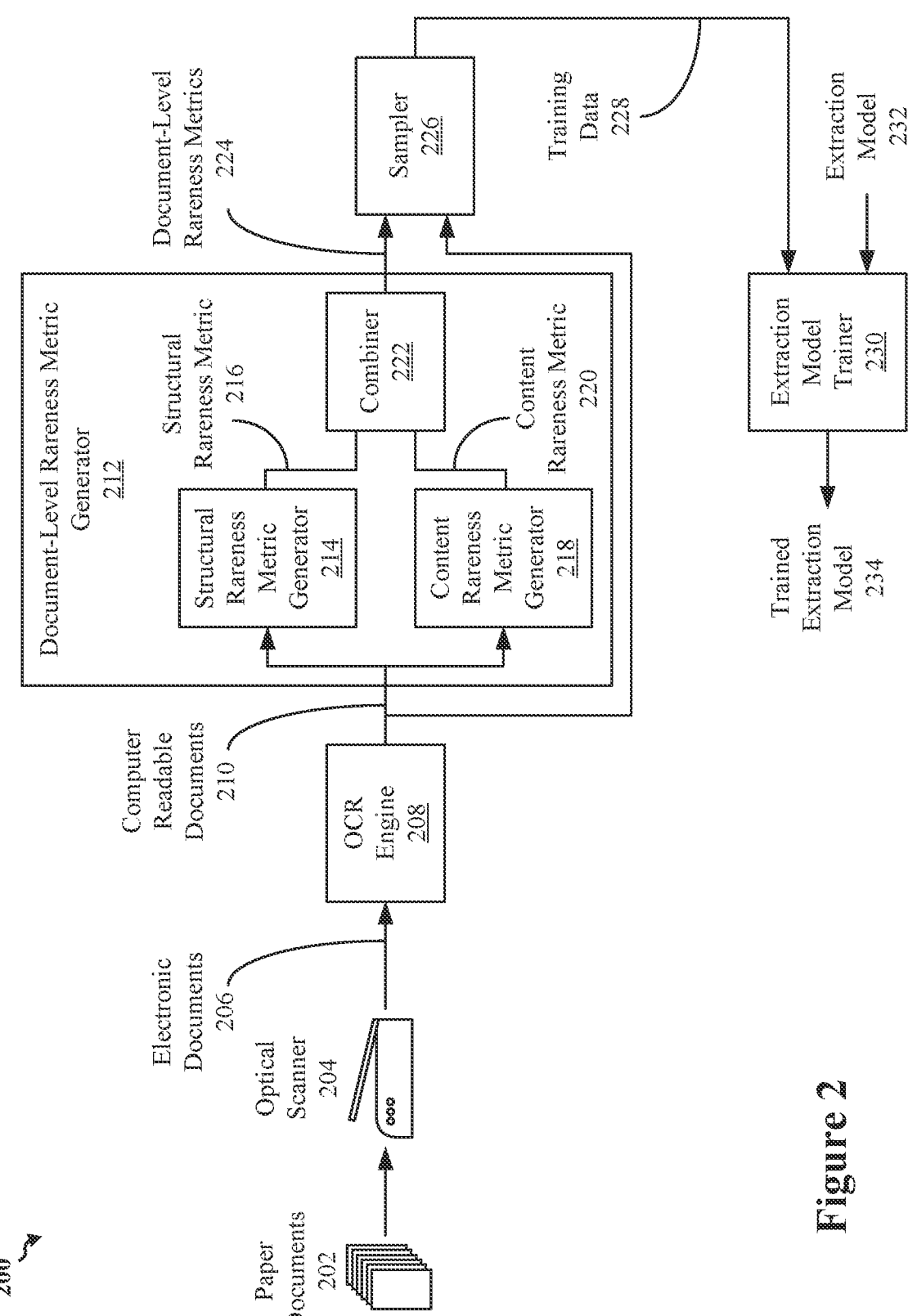
FIG. 2 shows an example block diagram for generating a training data to train an extraction model, according to some implementations.

FIG. 2 shows an example block diagram 200 for training an extraction model 232, according to some implementations. In some implementations, the block diagram 200 is implemented in the system 100 depicted in FIG. 1. In block diagram 200, the optical scanner 204 may be an example implementation of the optical scanner 115 in FIG. 1, the OCR engine 208 may be an example implementation of the OCR engine 190 in FIG. 1, the document-level rareness metric generator 212 may be an example implementation of the document-level rareness metric generator 140, the sampler 226 may be an example implementation of the sampler 170 in FIG. 1, and the extraction model trainer 230 may be an example implementation of the extraction model trainer 180 in FIG. 1. FIG. 2 is discussed below in combination with FIG. 3, wherein FIG. 3 shows an illustrative flow chart of an example operation 300 of generating a training data to train an extraction model, according to some implementations. To note, the example operation 300 is described as being performed by the system 100 in FIG. 1, with the block diagram 200 being an example configuration of the system 100.

At 302, the system 100 obtains a plurality of computer readable documents, with each of the computer readable documents being generated by performing OCR on an electronic document. In some implementations of obtaining the plurality of computer readable documents, the system 100 (such as the optical scanner 115 scans a plurality of paper documents to generate a plurality of electronic documents (304). The system 100 (such as the OCR engine 190) also performs OCR on the plurality of electronic documents to generate the plurality of computer readable documents (306).

For example, referring to FIG. 2, paper documents 202 are scanned by an optical scanner 204 to generate electronic documents 206. To note, since the electronic documents may be included in training data to train an extraction model, the electronic documents 206 to be used to generate the training data are previous documents, which may have been scanned previously and stored, with the text extracted from those documents also stored as the desired text to be extracted from those documents. For example, the database 120 of the system 100 may store previous documents of different types that may be used to generate new training data sets for training of an extraction model to extract text from a specific type of document. As such, scanning of a paper document may occur much earlier than the use of the electronic document. Alternatively, while not depicted in FIG. 2, an electronic document may be directly generated by a computing system without the use of a paper document. For example, a computing device may generate a portable document format (pdf) document or a Joint Photographic Experts Group (JPEG) image that is an electronic document. The system 100 may receive the electronic document via the interface 110 from the device that generated the electronic document or is storing the electronic document generated by another device. As such, the system 100 obtaining an electronic document may be based on the electronic document being generated through scanning of a paper document or the electronic document being generated directly by another device without the need for a paper document.

With the electronic documents 206 obtained, the OCR engine 208 performs OCR on each of the electronic documents 206 to generate the computer readable documents 210. Each electronic document (such as a JPEG image) may be defined as a grid of pixel values. In performing OCR on an electronic document having a grid of pixel values, the OCR engine 208 generates bounding boxes to bound the pixels associated with each token to be identified (such as each word, which may also be a number or other identifiable character text). For example, for OCR, the bounding boxes may be generated based on white space between dark edges and contrast among neighboring pixels to identify the pixel locations of breaks between words or other tokens. The OCR engine 208 defines the bounding boxes using two dimensional coordinates (such as x and y coordinates indicating the upper left and lower right pixel corners of each bounding box or all for corners of each bounding box) for the electronic document 206, and the coordinates may be stored as part of the computer readable document 210 generated from the electronic document 206 (such as in a table of coordinates). For each bounding box of pixels of the electronic document, the OCR engine 208 may use pattern recognition of text characters across the pixels in the box to identify the characters and sequence of characters. The OCR engine 208 may further process the sequence of characters using one or more dictionaries to correct any errors that may occur via scanning or via the pattern recognition process. In this manner, each bounding box is associated with an identified text token, with the computer readable document generated having a plurality of identified text tokens based on the plurality of bounding boxes. As such, the computer readable document 210 of an electronic document 206 may include the identified text broken into sequences of words (which may be formatted or broken into lines, sections, or other separations within the document (such as being separated from another token by a line in the document)) and the bounding boxes associated with those words. As noted above, the computer readable document 210 (and the electronic document 206) may also be associated with a label of the text previously defined as to be extracted by the extraction model from the document.

Referring back to FIG. 3, at 308, the system 100 (such as the document-level rareness metric generator 140) generates, for each document of the plurality of computer readable documents, a document-level rareness metric based on the document. As noted above, a document-level rareness metric of a document may be based on one or both of a structural rareness metric of the document or a content rareness metric of the document. If the document-level rareness metric of the document is based at least in part on a structural rareness metric of the document, the system 100 (such as the structural rareness metric engine 150) generates a structural rareness metric for the document (310). If the document-level rareness metric of the document is based exclusively on the structural rareness metric, the document-level rareness metric may be the structural rareness metric for the document, and the system 100 may not perform steps 312 and 314. If the document-level rareness metric of the document is based at least in part on a content rareness metric of the document, the system 100 (such as the content rareness metric engine 160) generates a content rareness metric for the document (312). If the document-level rareness metric of the document is based exclusively on the content rareness metric, the document-level rareness metric may be the content rareness metric for the document, and the system 100 may not perform steps 310 and 314. If the document-level rareness metric of the document is based on both the structural rareness metric and the content rareness metric of the document, the system 100 generates both the structural rareness metric and the content rareness metric for the document (thus performing steps 310 and 312), and the system 100 combines the structural rareness metric and the content rareness metric to generate the document-level rareness metric for the document (314).

For example, referring back to FIG. 2, with the OCR engine 208 generating the computer readable document 210, the computer readable document 210 is provided as an input to the document-level rareness metric generator 212. As an example implementation, the document-level rareness metric generator 212 is depicted as including both a structural rareness metric generator 214 to generate a structural rareness metric 216 of a computer readable document 210 and a content rareness metric generator 218 to generate a content rareness metric 220 of the computer readable document 210. The document-level rareness metric generator 212 is also depicted as including a combiner 222 to combine the structural rareness metric 216 and the content rareness metric 220 of the computer readable document 210 to generate the document-level rareness metric 224 for the computer readable document 210 (and thus for the associated electronic document 206).

Referring first to the structural rareness metric generator 150, as noted above, the structural rareness metric generator 150 generates a structural rareness metric for a computer readable document provided as input. In some implementations, the structural rareness metric for a document is based on the bounding boxes (also referred to herein as OCR bounding boxes) generated by the OCR engine for the document when performing OCR on an electronic document. The structural rareness metric generator 150 generating a structural rareness metric of a computer readable document (such as the structural rareness metric generator 214 generating a structural rareness metric 216 from a computer readable document 210) is described below with reference to FIG. 4.

FIG. 4 shows an illustrative flow chart of an example operation 400 of generating a structural rareness metric of a first document, according to some implementations. The example operation 400 is an example implementation of step 310 of the example operation 300 in FIG. 3 and is described as being performed by the system 100 (including the structural rareness metric generator 150) in FIG. 1, with the block diagram 200 in FIG. 2 being an example configuration of the system 100.

At 402, the system 100 generates, for each computer readable document of a plurality of computer readable documents, a plurality of bounding boxes in the computer readable document based on recognized text in the computer readable document. For example, the OCR engine 190 may generate the bounding boxes of a computer readable document when performing OCR on an electronic document. As noted above, a bounding box bounds at least one token in the computer readable document, with the text of the token being identified by the OCR engine 190. In some implementations, each bounding box in the computer readable document bounds only one word of the recognized text in the computer readable document (404). As noted above, the bounding boxes may be represented and stored as coordinates of the bounding boxes in the layout of the computer readable document or electronic document. To note, the first document for which a structural rareness metric is to be generated is included in the plurality of computer readable documents.

At 406, the system 100 (such as the structural rareness metric generator 150) generates, for each computer readable document of the plurality of computer readable documents, an embedding of the computer readable document based on the plurality of bounding boxes of the computer readable document. In some implementations, the structural rareness metric generator 150 includes a pre-trained transformer model (referred to herein as a transformer) to convert the coordinates of the bounding boxes into an embedding. For example, the structural rareness metric generator 150 may include a Language Independent Layout Transformer (LiLT) model configured to receive the set of bounding boxes of a document as coordinates of the bounding boxes in the pixel grid of the document and generate an embedding for the document from the set of bounding boxes. Referring back to FIG. 4, in some implementations of step 406, an LiLT model of the structural rareness metric generator 150 generates, for each computer readable document of the plurality of computer readable documents, an embedding from the entire set of bounding boxes of the computer readable document (408). In this manner, each document is associated with an embedding representing the locations of the tokens (irrespective of those tokens' content) in the document.

In some implementations, the LiLT model may be LiLT backend services hosted by another and accessed using the LiLT REST application programming interface (API) implemented in the Python programming language in the system 100. As such, the system 100 may format and provide the bounding box coordinates to the device hosting the LiLT model via the API. The system 100 may then receive the embedding from the LiLT model via the API.

To embed the set of bounding boxes of a document, the LayoutFlow function of the LiLT model may be used to generate a fixed size embedding. For example, Ba may be defined as the set of bounding boxes for a document d of type t($d_t$). As noted above, the documents may be divided into different types, for example, for tax-related documents, documents may be divided into types including W-2s, 1099*s* (or specific 1099*s*, such as DIV, INT, etc.), and so on. $V_d$ may be defined as the corresponding layout embedding (which is a vector) for the document d of type t($d_t$). As such, the instruction to generate $V_d$ that is executed (such as inputting into the API by the system 100 to generate $V_d$) is LiLTLayoutFlow(B$_d$).

At 410, the system 100 calculates, for a group including all computer readable documents of the same type from the plurality of computer readable documents, a centroid of the group, with the group including the first document (410). For example, each document may include an indication of its type, and the type may be stored with the document in the database 120 of the system 100. In this manner, the system 100 may identify the type of the first document for which a structural rareness metric is to be generated, identify all of the computer readable documents of the same type, and group together the computer readable documents of that same type. Referring back to the example of tax-related documents, if the first document is a W-2 statement, the system 100 groups all computer readable documents including W-2 statements in the plurality of computer readable documents. Continuing the above definitions, the group of documents of type t is defined as a labeled set N of type t($N_t$).

The centroid of the group is any suitable indication of a center mass of the group based on the embeddings of the documents in the group. In some implementations, the centroid of the group is a mean vector of the embeddings of the computer readable documents in the group (412). As such, the structural rareness metric generator 150 may generate a mean vector from the set of vectors that are the embeddings of the computer readable documents in the group. The mean vector may be defined as $\mu$, which is the normalized sum of vectors across the group in documents in set N, such as defined in equation (1) below:

$$\mu = \sum_{d \in N_T} V_d \tag{1}$$

Referring back to FIG. 4, at 408, the system 100 (such as the structural rareness metric generator 150) calculates a distance between the centroid and an embedding of the first document. Conceptually, the centroid may be a mean vector indicating the representative of the group (which is the smallest sum of distances to all of the embeddings of documents of the same type). It is expected that the greater the distance between the vector (embedding) of the first document and the mean vector, the more of an outlier or rare the formatting of the bounding boxes in the first document. As such, the rareness of the first document is proportional to a distance between the centroid of the group and the embedding of the first document, and the structural rareness metric of the first document may be the distance calculated by the system 100 in step 408 between the centroid and the embedding.

In some implementations of calculating a distance in step 408, the system 100 (such as the structural rareness metric generator) calculates a covariance matrix of the group from the embeddings of the computer readable documents in the group, with the distance being calculated based on the covariance matrix (410). Continuing with the above definitions, the covariance matrix may be defined as S. The system 100 calculates the covariance matrix as the expectation over the matrix of a dot product between the difference between the first document vector and the group centroid and a transpose of the first document vector and the group centroid, as depicted in equation (2) below:

$$S = E\left[(V_d - \mu) \cdot (V_d - \mu)^T\right] \tag{2}$$

In some implementations, the system 100 calculates the distance between $V_d$ and $\mu$ as a directionally normalized distance from the centroid. For example, the system 100 may calculate a Mahalanobis distance between $V_d$ and $\mu$, and a structural rareness metric $S_S(d)$ of the first document d may be proportional to the calculated distance, such as depicted in equation (3) below:

$$S_S(d) \propto \sqrt{(V_d - \mu)S^{-1}(V_d - \mu)^T} \tag{3}$$

In some implementations, the system 100 calculates the structural rareness metric $S_S(d)$ as equal to the Mahalanobis distance. In some other implementations, the structural rareness metric may be calculated as a different distance measure as long as the proportionality between the structural rareness metric and the distance is satisfied, such as depicted in equation (3). If the document-level rareness metric is based exclusively on the structural rareness metric for the first document, the system 100 may define the document-level rareness metric for the first document as $S_S(d)$. While the example operation 400 is depicted as being executed for generating a structural rareness metric for one document, example operation 400 may be executed by system 100 for each document that a structural rareness metric is to be generated by the system 100.

In addition or alternative to generating a structural rareness metric, the system 100 may generate a content rareness metric in generating a document-level rareness metric for a document. For example, the content rareness metric generator 160 of the document-level rareness metric generator 140 may generate a content rareness metric for one or more computer readable documents generated by the OCR engine 190. As noted above, a content rareness of a document indicates a rareness of the text in the document and may be irrespective of the structure of the document. The content rareness metric generator 160 generating a content rareness metric of a computer readable document (such as the content rareness metric generator 218 generating a content rareness metric 220 from a computer readable document 210) is described below with reference to FIG. 5.

FIG. 5 shows an illustrative flow chart of an example operation 500 of generating a content rareness metric of a first document, according to some implementations. The example operation 500 is an example implementation of step 312 of the example operation 300 in FIG. 3 and is described as being performed by the system 100 (including the content rareness metric generator 160) in FIG. 1, with the block diagram 200 in FIG. 2 being an example configuration of the system 100.

At 502, the system 100 (such as the content rareness metric generator 160) identifies, for each computer readable document in a group of computer readable documents of a same type, a set of fields to be extracted. As described above with reference to generating a structural rareness metric, the system 100 may group computer readable documents of a same type into one group. For example, all documents having a W-2 statement may be grouped into one group (such as by the database 120 storing an indication of the type of document and the system 100 identifying the types of documents based on the indications and generating one or more groups for one or more different types of documents).

With the group generated by the system 100 based on document type, the system 100 is thus able to process each document in the group. As noted above, with the documents being previous documents that may be included in the training data, the text in the documents is known (such as through previous processing and extraction as described above). As such, the text to be extracted from a document is known, and the text may be organized into defined fields (which may also be referred to herein as entities) for the type of document. For example, referring back to a document including a W-2 statement, the fields of text may include an employer identification number field, an employer name and address field, an employee social security number field, a wages amount field, a federal tax amount field, and so on. To note, the fields may be defined in any suitable manner to differentiate between different text in the document, such as based on text being together or separated in documents across the group, the type of information the text conveys, and so on.

The extraction model may be trained to extract all fields or a specific subset of defined fields from a document of that type. In identifying the set of fields to be extracted from a computer readable document, the system 100 identifies those fields existing in the document that are desired to be extracted from the document by the extraction model once it is trained. In a simplified example, if an extraction model is to be trained to extract 50 specific fields of text from a new computer readable document of the same type, the system 100 identifies which of the 50 specific fields are included in the existing computer readable document being processed to generate a training data to train the extraction model.

In some implementations, the known text of a document being organized into fields includes each segment of text of a field being associated with a tag that indicates the field. The tags and the text corresponding to the tag may be stored, e.g., as a key-value pair in the database 120 as part of are associated with the computer readable document. In this manner, the system 100 may access the database 120 for a computer readable document and identify the specific fields of text included in the document based on the stored tags. If the extraction model is to extract only a subset of potential fields, the specific fields may be predefined (such as by a caller to an extraction service and/or by a use case stakeholder of the extraction model). In this manner, the system 100 may only identify those fields based on the tags that are included in the subset of potential fields for extraction. Otherwise, if the extraction model is to extract all fields, the system 100 may identify all of the fields included in the document based on all tags associated with the document.

For example, for a document d of type t (i.e., t(d)), $E_t$ may be defined as the set of all fields or entities $\{e_1, e_2, \ldots, e_k\}$ for a defined value k (with k indicating the set size) to be extracted for the document type t (with k being the number of all fields defined that may appear in the document type). For example, system 100 may determine k by counting the number of unique tags across the documents included in the group. In some implementations of identifying the set of fields existing in a document, the system 100 may generate a binary vector Ga indicating which of the fields or entities $\{e_1, e_2, \ldots, e_k\}$ exist in the document based on the tags associated with the document and stored in the database 120.

At 504, the system 100 (such as the content rareness metric generator 160) identifies which fields across all sets of fields for the group are included in the first document. As noted above, the system 100 is to generate a content rareness metric for the first document. As such, the system 100 is to identify which of the fields or entities $\{e_1, e_2, \ldots, e_k\}$ also exist in the first document. Similar to step 502, in some implementations, the system 100 may generate a binary vector $G_d$ indicating which of the fields or entities $\{e_1, e_2, \ldots, e_k\}$ exist in the first document based on the tags associated with the first document and stored in the database 120.

At 506, the system 100 (such as the content rareness metric generator 160) calculates a rareness of the identified fields in the first document, with the content rareness metric of the first document being based on the rareness measure of the identified fields in the first document. In some implementations, a rareness measure of an identified field in the first document is inversely proportional to an occurrence rate of the field across the documents in the group. For example, a field that appears in 2 of 100 documents in a group is rarer than a field that appears in 75 of the 100 documents in the group. As such, calculation of the content rareness metric for the first document is based on the occurrence rates across the documents in the group of the fields appearing in the first document.

For example, a Dirac delta function $\delta(e_t, d)$ for t from 1 to k may be defined as a binary indication as to whether the field $e_t$ exists in document d, and the occurrence rate of a field $e_t$ may be defined as $f(e_t)$. System 100 may calculate $f(e_t)$ as the sum of the number of documents in the group including the field divided by the total number n of documents in the group $N_t$, such as depicted in equation (4) below:

$$f(e_t) = \sum\nolimits_{i \in N_t} (\delta(e_t, d)) \div n \qquad (4)$$

In this manner, the occurrence rate $f(e_t)$ for any field $e_t$ is a percentage from 0 to 1 (i.e., $0 \leq f(e_t) \leq 1$). For a new document to be input to the extraction model, the occurrence rate $f(e_t)$ of a field $e_t$ to be extracted by the model as calculated by the system 100 in generating the content rareness metric for a previous document may be conceptualized as the marginal probability of observing entity $e_t$ in the new document. To simplify processing, it is assumed that the probability of an occurrence of any entity in a document does not depend on the occurrence of any other entities in the document (i.e., the individual fields or entities are assumed to be independent from each other). As such, a content rareness metric for a document is based on a combined individual rareness of the fields included in the document.

In calculating the content rareness metric for the first document d having the subset of fields as indicated by Ga, the overall set of fields $E_t$ for the document type t may be partitioned into a disjoint subset of fields present in the first document d (defined as Pa) and those fields absent in the first document d (defined as $Q_d$). Since the occurrence of individual fields is independent of each other, the union of $P_d$ and $Q_d$ equals $E_t$ and the intersection of $P_d$ and $Q_d$ is a null set. As such, the system 100 may calculate an unnormalized probability of an observed existence of the combination of fields in $G_d$ as the collection of independent fields in $G_d$ for the first document d. The unnormalized probability for the first document d, which is defined as $Pr(G_d)$, is the product of the marginal probability of observing an entity across the observed entities ($P_d$) times the product of the probability of not observing an entity across the unobserved entities ($Q_d$) for the first document d, such as depicted in equation (5) below:

$$Pr(G_d) = \prod\nolimits_{i \in P_d} f(e_i) * \prod\nolimits_{j \in Q_d} (1 - f(e_j)) \qquad (5)$$

In some implementations, the system 100 may normalize the probabilities. However, normalization of $Pr(G_d)$ to determine an exact document-level occurrence of the combination of fields would involve enumeration of all possible partitions (P, Q) of the fields in $E_t$ to determine all potential unnormalized probabilities $Pr(G)$, with the sum of the unnormalized probabilities used to normalize each probability $Pr(G)$ on a scale of 0 to 1. As the number of possible partitions grows exponentially with the number of fields in E, the number of computations that would need to be executed to perform normalization exponentially increases. As such, in some other implementations, the system 100 may use the unnormalized probability $Pr(G_d)$ as an approximation of a document level occurrence of the combination of the fields to reduce the number of numerical operations to be executed and thus reduce time and processing resources required to generate a content rareness metric.

To note, the document level unnormalized probability $Pr(G_d)$ for a first document d is inversely related to a rareness of the combination of the fields occurring in the first document d. In other words, smaller $Pr(G_d)$ indicates a rarer combination of fields that occur in the first document. As such, the content rareness metric for a first document d is inversely related to $Pr(G_d)$ calculated by the system 100 for the first document d. To conceptualize how the rareness of each field impacts the final document-level probability and the inverse relationship between the probability and, for a field that occurs in the first document and has a 5 percent chance of occurring in a document (i.e., f(e)=0.05), the product in calculating $Pr(G_d)$ includes a 0.05. Compared to a field that occurs in the first document and has a 95 percent chance of occurring in a document (i.e., f(e)=0.95), with the product in calculating $Pr(G_d)$ includes a 0.95, multiplying by 0.05 instead of 0.95 causes $Pr(G_d)$ to be a smaller number. Conversely, for a field that does not occur in the first document and has a 5 percent chance of occurring in a document (i.e., f(e)=0.05), the product in calculating $Pr(G_d)$ includes a 0.95 (i.e., 1-0.05). Compared to a field that does not occur in the first document and has a 95 percent chance of occurring in a document (i.e., f(e)=0.95), with the product in calculating $Pr(G_d)$ includes a 0.05 (i.e., 1-0.95), multiplying by 0.95 instead of 0.05 causes $Pr(G_d)$ to be a larger number.

In some implementations, the system 100 calculates the content rareness metric for a first document d (which may be defined as $S_C(d)$) as 1 divided by the unnormalized probability $Pr(G_d)$, such as depicted in equation (6) below:

$$S_C(d) = 1 \div Pr(G_d) = 1 \div \left( \prod\nolimits_{i \in P_d} f(e_i) * \prod\nolimits_{j \in Q_d} (1 - f(e_j)) \right) \qquad (6)$$

In this manner, the content rareness metric $S_C(d)$ is inversely proportional to the probability of observing a set of entities present in the first document d. If the document-level rareness metric is based exclusively on the content rareness metric for the first document, the system 100 may define the document-level rareness metric for the first document as $S_C(d)$. While the example operation 500 is depicted as being executed for generating a content rareness metric for one document, example operation 500 may be executed by system 100 for each document that a content rareness metric is to be generated by the system 100.

In some implementations, a document-level rareness metric of a document includes a combination of the structural rareness metric generated for the document and the content rareness metric generated for the document. In such an implementation and referring back to FIG. 2, the combiner 222 of the document-level rareness metric generator 212 combines the structural rareness metric 216 for a document and the content rareness metric 220 for the document to generate the document-level rareness metric 224 for the document. For example, the two values may be numerically combined (such as multiplied) by the combiner 222 to generate a single scalar value as the document-level rareness metric 224. In another implementation, the values may be combined into a two value matrix or set as the document-level rareness metric 224. The generation of the training data may thus be based on the document-level rareness metrics 224 that combine the structural rareness metric 216 and the content rareness metric 220 for each computer readable document 210 of the same type for which the extraction model 232 is to be trained.

Referring back to FIG. 3, the document-level rareness metrics are generated for the plurality of computer readable documents by the document-level rareness metric generator 140 in step 308. At 316, the system 100 (such as the sampler 170) samples the plurality of computer readable documents at a document level based on the document-level rareness metrics of the plurality of computer readable documents to obtain a subset of computer readable documents, with a training data for training an extraction model including the subset of computer readable documents. For example, the training data may be defined as to include 100 documents, and the system 100 samples 100 documents from the plurality of computer readable documents to be the training data for training the extraction model. Referring back to FIG. 2, the sampler 226 samples the computer readable documents 210 based on the document-level rareness metrics 224 to generate the training data 228 having a defined number of computer readable documents 210. In some implementations, sampling may include performing a random sampling, but with the sampling weighted towards selecting documents with higher document-level rareness metrics. For example, the system 100 may duplicate the number of instances of a document a number of times based on the document-level rareness metric of the document such that the sampler is more likely to select the document than if not duplicated. In a specific example, the document-level rareness metrics may be divided into bands, with each band associated with a defined number of instances of each document associated with the band to be included in the pool of documents for sampling. In this manner, rarer documents have more instances in the pool for sampling and thus a higher probability of being sampled.

Referring back to FIG. 3, in some other implementations of sampling in step 316, the system 100 (such as the sampler 170) may perform top-percentile sampling on the plurality of computer readable documents based on the document-level rareness metrics (318). Top-percentile sampling is based on the top-K sampling algorithm. Top-K sampling is one of the sampling algorithms used in the decoding stage of transformers used for next token prediction based on a conditional likelihood. Typically for top-K sampling, the K most likely next tokens for token prediction (such as based on logits for mapping probabilities for prediction) that are filtered and randomly sampled among top K are selected. The top-K sampling algorithm may be configured for use by the system 100 as top-percentile sampling to sample the pool of documents in order to build the set of documents as training data for training the extraction model.

As used herein, top-percentile sampling performed by the system 100 may refer to a top-percentile sampling in which sampling is performed on a top percentile of the pool of documents based on the percentile of the document-level rareness metrics of the documents. As such, K for top-percentile sampling may refer to the K percentile of documents to be sampled by the system 100. In some implementations, the top-percentile sampling configured for and performed by the system 100 may be an iterative operation of sampling to generate a subset of the entire final set of samples so that the final set is generated in a piecewise manner. For example, the total number of documents to be included in the final set of samples may be defined, and a number of iterations to sample the documents for generating the final set may be defined. For each iteration of sampling, the system 100 may sample the documents to obtain a number of documents equal to the total number of documents to be included divided by the number of iterations. For example, if 100 documents are to be sampled and 10 iterations of sampling are to be performed, the system 100 may sample 10 documents each iteration. In addition, for top-percentile sampling, the system 100 adjusts the pool of documents for sampling based on the document-level rareness metric. For example, for one or more iterations, the system 100 may remove documents from the pool associated with a document-level rareness metric that is less than a rareness threshold. In some implementations, the rareness threshold is a percentile of the number of document-level rareness metrics. As the number of iterations increases, the system 100 may also increase the threshold (such as by a defined increment) or use a defined threshold that is associated with the specific iteration such that the used threshold increases as the iterations increase. As such, a larger percentile of rarer documents is included in the pool for sampling over subsequent iterations. A specific implementation of top-percentile sampling that may be performed by the system 100 (such as the sampler 170) is described below with reference to FIG. 6.

FIG. 6 shows an illustrative flow chart of an example operation 600 of performing top-percentile sampling on a plurality of computer readable documents, according to some implementations. The example operation 600 is an example implementation of step 318 of the example operation 300 in FIG. 3 and is described as being performed by the system 100 (including the sampler 170) in FIG. 1, with the block diagram 200 in FIG. 2 being an example configuration of the system 100.

At 602, the system 100 identifies the computer readable documents from the plurality of computer readable documents based on the document-level rareness metric to be included in a subgroup (which may also be referred to as a pool or sub-pool) from which sampling is to be performed. For example, a rareness threshold may be defined for the system 100 to compare each of the document-level rareness metrics. In this manner, the system 100 may include in the subgroup the computer readable documents having a document-level rareness metric greater than a defined rareness threshold (604). As noted above, in some implementations, the rareness threshold may be a percentile of document-level rareness metrics across the group of documents of the same type. For example, the threshold may be 50 percent, such that the documents having the top 50 percent of document-level rareness metrics are to be included in the pool. For a percentile threshold, the system 100 may generate a sorted list of the documents in the group (or otherwise sort the documents) based on the document-level rareness metric and remove the bottom percentage of documents from the sorted list based on the percentile threshold. In this manner, the system 100 may generate a subgroup of documents from the plurality of computer readable documents, with a document-level rareness metric of each document in the subgroup being greater than the threshold.

At 606, the system 100 randomly samples the subgroup to generate a random sample of documents, with the subset of computer readable documents of the training data including the random sample of documents. For example, the system 100 may be configured to randomly sample a defined number of documents from the subgroup during the iteration of sampling (which may be the same or configured to change for other iterations of sampling a subgroup).

As noted above, sampling may be performed over iterations such that steps 602-606 are performed iteratively. For example, the system 100 may be configured to perform a defined number of iterations, with the system 100 using a counter, another suitable means to determine when the number of iterations has been performed so that the process may end. At decision block 608, if another iteration of sampling is not to be performed by the system 100, the process ends, with the training data being the documents having been sampled during the iterations of step 606.

If another iteration is to be performed, the process proceeds to step 610. At 610, the system 100 adjusts the rareness threshold. For example, the threshold may be increased by a defined amount for each iteration. In another example, a threshold may be defined for each iteration, with the threshold for a successive iteration being greater than the threshold for the current iteration. In this manner, the threshold increases each iteration of the plurality of iterations. In some implementations of step 610 in which the rareness threshold is a percentile threshold, the system 100 may increase the percentile threshold (612). The process reverts to step 602, and the process continues until the number of iterations of sampling are performed to generate the training data.

In a specific example of operation 600 and referring to FIG. 2, a defined number of documents from the computer readable documents 210 is to be randomly sampled by the sampler 226 over ten iterations to generate the training data 228. A tenth of the defined number of documents is to be randomly sampled during the first iteration, another tenth of the defined number of documents is to be randomly sampled during the second iteration, and so on over the ten iterations. The rareness threshold to be used for generating the subgroup of documents for sampling is a percentile threshold, and the percentile threshold increases from 0 percent to 90 percent over the ten iterations. As such, the percentile threshold for the first iteration is 0 percent (indicating that no documents are to be removed from the group to generate the subgroup), the percentile threshold for the second iteration is 10 percent (indicating that documents having a document-level rareness metric in the lowest 10 percent of document-level rareness metrics of the group are to be removed to generate the subgroup), the percentile threshold for the third iteration is 20 percent (indicating that documents having a document-level rareness metric in the lowest 20 percent of document-level rareness metrics of the group are to be removed to generate the subgroup), and so on up to the percentile threshold for the tenth iteration being 90 percent (indicating that documents having a document-level rareness metric in the lowest 90 percent of document-level rareness metrics of the group are to be removed to generate the subgroup, thus leaving only the documents having a document-level rareness metric in the top 10 percent of document-level rareness metrics of the group). In this manner, the subgroup increasingly becomes smaller and consists of a higher proportion of rarer documents based on the document-level rareness metrics such that there is a higher likelihood that rarer documents are randomly sampled during successive iterations of sampling.

Referring back to FIG. 3, the training data is generated by the system 100 (such as the sampler 170) in step 316. In some implementations, with the training data generated, the system 100 (such as the extraction model trainer 180) trains the extraction model using the training data (320). In some implementations, the extraction model trainer 180 performs supervised learning based on the labels associated with the documents in the training data that indicates the text to be extracted from the associated document by the extraction model. In this manner, a loss function between the actual text extracted and the desired text to be extracted is defined to output a loss that is to be minimized during training. For example, referring back to FIG. 2, the extraction model trainer 230 receives the training data 228 generated by the sampler 226 (such as by performing operation 600 depicted in FIG. 6) and trains the extraction model 232 (which may be stored in the system 100, such as in the database 120) using the training data 228 to generate the trained extraction model 234.

While not depicted in FIG. 2 or FIG. 3, in some implementations, the system 100 puts the trained extraction model to use in a real-world application. For example, the system 100 may execute the trained extraction model to apply the model to new documents obtained by the system 100. For example, the extraction model may be trained to extract specific text from a W-2 statement, and when the system 100 obtains a new document including a W-2 statement, the system 100 may perform OCR on the document and apply the trained extraction model on the OCR'd document to extract the text from the W-2 statement. Additionally or alternatively, the system 100 may distribute the trained extraction model to one or more other devices for the device to execute the trained extraction model on new OCR'd documents.

While the Figures depict and the examples above are regarding the training of one extraction model, a plurality of extraction models may be trained for different text to be extracted or for different types of documents to be processed for text extraction. To train the different models, the system 100 may perform operation 300, which may include one or more of operations 400-600, for each model to be trained in order to generate the specific training data to be used to train that specific model. To note, training different models may refer to training different instances of the same model for the model to be trained for extracting specific text or for a specific type of document.

As described herein, a system 100 may be implemented to generate training data to train one or more extraction models and to train the one or more extraction models. With the training data being generated to compensate for a low occurrence of rare documents being included in the training data while attempting to maintain coverage across document types in the sampled documents, the performance of a trained extraction model is to be improved. In addition, with the system 100 able to automatically generate the training data and train the extraction model with such balance in sampling for generating the training data in consideration (and thus not requiring manual generation of the training data), the system 100 is able to efficiently train one or more extraction models (which may be a large plurality of models). For example, in many use cases, the number of previous documents that may be sampled may be in the millions, tens of millions, or even hundreds of millions, and manual review and sampling of the large corpus of documents to generate the training data may be impossible. As such, the system 100 enables such generation of the training data and training of the extraction model.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c. In addition, the term "document" may be used interchangeably with "electronic document" or "computer readable document" based on how it is used above.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer readable medium. The processes of a method or algorithm disclosed herein may be implemented in a processor-executable software module which may reside on a computer readable medium. Computer readable media includes both computer storage media and communication media including any medium that can be enabled to transfer a computer program from one place to another. A storage media may be any available media that may be accessed by a computer. By way of example, and not limitation, such computer readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer readable media. Additionally, the operations of a method or algorithm may reside as one or any combination or set of codes and instructions on a machine readable medium and computer readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for generating training data for training an extraction model, the method comprising:

obtaining a plurality of computer readable documents, wherein each of the computer readable documents is generated by performing optical character recognition (OCR) on an electronic document;

for each document of the plurality of computer readable documents, generating a document-level rareness metric based on the document; and sampling the plurality of computer readable documents at a document level by performing top-percentile sampling on the plurality of computer readable documents based on the document-level rareness metrics of the plurality of computer readable documents to obtain a subset of computer readable documents, wherein the training data for training the extraction model includes the subset of computer readable documents.

2. The method of claim 1, wherein a document-level rareness metric of a first document in the plurality of computer readable documents includes a structural rareness metric that indicates a rareness of a structure in the first document.

3. The method of claim 2, wherein generating the structural rareness metric of the first document includes:

for each computer readable document of the plurality of computer readable documents:

generating a plurality of bounding boxes in the computer readable document based on recognized text in the computer readable document; and generating an embedding of the computer readable document based on the plurality of bounding boxes;

for a group including all computer readable documents of a same type from the plurality of computer readable documents, calculate a centroid of the group, wherein the group includes the first document; and calculating a distance between the centroid and an embedding of the first document.

4. The method of claim 3, wherein each bounding box in a computer readable document bounds only one word of the recognized text in the computer readable document.

5. The method of claim 3, wherein generating the structural rareness metric of the first document further includes calculating a covariance matrix of the group from the embeddings of the computer readable documents in the group, wherein:

the centroid of the group is a mean vector of the embeddings of computer readable documents in the group; and the distance between the centroid and the embedding of the first document is a Mahalanobis distance.

6. The method of claim 1, wherein the document-level rareness metric of a first document in the plurality of computer readable documents includes a content rareness metric that indicates a rareness of a content in the first document.

7. The method of claim 6, wherein the first document is in a group of computer readable documents of a same type and generating the content rareness metric of the first document includes:

identifying, for each computer readable document in the group, a set of fields to be extracted;

identifying which fields across all sets of fields for the group are included in the first document; and calculating a rareness of the identified fields in the first document, wherein the content rareness metric of the first document is based on the rareness of the identified fields in the first document.

8. The method of claim 1, wherein the document-level rareness metric of a first document in the plurality of computer readable documents includes a combination of a structural rareness metric that indicates a rareness of a structure in the first document and a content rareness metric that indicates a rareness of a content in the first document.

9. The method of claim 1, wherein performing top-percentile sampling on the plurality of computer readable documents includes, for each of a plurality of iterations:

generating a subgroup of documents from the plurality of computer readable documents, wherein:

a document-level rareness metric of each document in the subgroup is greater than a threshold; and the threshold increases each iteration of the plurality of iterations; and randomly sampling the subgroup to generate a random sample of documents, wherein the subset of computer readable documents includes the random samples of documents generated across the iterations.

10. A system for generating training data for training an extraction model, the system comprising:

one or more processors; and a memory storing instructions that, when executed by the one or more processors, causes the system to perform operations comprising:

obtaining a plurality of computer readable documents, wherein each of the computer readable documents is generated by performing optical character recognition (OCR) on an electronic document;

for each document of the plurality of computer readable documents, generating a document-level rareness metric based on the document; and sampling the plurality of computer readable documents at a document level by performing top-percentile sampling on the plurality of computer readable documents based on the document-level rareness metrics of the plurality of computer readable documents to obtain a subset of computer readable documents, wherein the training data for training the extraction model includes the subset of computer readable documents.

11. The system of claim 10, wherein a document-level rareness metric of a first document in the plurality of computer readable documents includes a structural rareness metric that indicates a rareness of a structure in the first document.

12. The system of claim 11, wherein generating the structural rareness metric of the first document includes:

for each computer readable document of the plurality of computer readable documents:

generating a plurality of bounding boxes in the computer readable document based on recognized text in the computer readable document; and generating an embedding of the computer readable document based on the plurality of bounding boxes;

for a group including all computer readable documents of a same type from the plurality of computer readable documents, calculate a centroid of the group, wherein the group includes the first document; and calculating a distance between the centroid and an embedding of the first document.

13. The system of claim 12, wherein each bounding box in a computer readable document bounds only one word of the recognized text in the computer readable document.

14. The system of claim 12, wherein generating the structural rareness metric of the first document further includes calculating a covariance matrix of the group from the embeddings of the computer readable documents in the group, wherein:

the centroid of the group is a mean vector of the embeddings of computer readable documents in the group; and the distance between the centroid and the embedding of the first document is a Mahalanobis distance.

15. The system of claim 10, wherein the document-level rareness metric of a first document in the plurality of computer readable documents includes a content rareness metric that indicates a rareness of a content in the first document.

16. The system of claim 15, wherein the first document is in a group of computer readable documents of a same type and generating the content rareness metric of the first document includes:

identifying, for each computer readable document in the group, a set of fields to be extracted;

identifying which fields across all sets of fields for the group are included in the first document; and calculating a rareness of the identified fields in the first document, wherein the content rareness metric of the first document is based on the rareness of the identified fields in the first document.

17. The system of claim 10, wherein the document-level rareness metric of a first document in the plurality of computer readable documents includes a combination of a structural rareness metric that indicates a rareness of a structure in the first document and a content rareness metric that indicates a rareness of a content in the first document.

18. The system of claim 10, wherein performing top-percentile sampling on the plurality of computer readable documents includes, for each of a plurality of iterations:

generating a subgroup of documents from the plurality of computer readable documents, wherein:

a document-level rareness metric of each document in the subgroup is greater than a threshold; and the threshold increases each iteration of the plurality of iterations; and randomly sampling the subgroup to generate a random sample of documents, wherein the subset of computer readable documents includes the random samples of documents generated across the iterations.

* * * * *